(12) United States Patent
Olszak (10) Patent No.: US 8,810,884 B1
(45) Date of Patent: Aug. 19, 2014

(54) LIGHT SOURCES FOR SPECTRALLY CONTROLLED INTERFEROMETRY

(71) Applicant: Artur Olszak, Tucson, AZ (US)

(72) Inventor: Artur Olszak, Tucson, AZ (US)

( * ) Notice: Subject to any disclaimer, the term of this patent is extended or adjusted under 35 U.S.C. 154(b) by 12 days.

(21) Appl. No.: 13/766,502

(22) Filed: Feb. 13, 2013

Related U.S. Application Data

(60) Provisional application No. 61/598,887, filed on Feb. 14, 2012.

(51) Int. Cl.
*G02B 26/00* (2006.01)

(52) U.S. Cl.
USPC ........................................ 359/237

(58) Field of Classification Search
USPC .............. 359/237, 245, 290–292, 204.5, 431, 359/438, 563, 566, 569, 625, 640
See application file for complete search history.

(56) References Cited

U.S. PATENT DOCUMENTS 7,102,760 B2 * 9/2006 Yamamoto et al. ........... 356/499

* cited by examiner

*Primary Examiner* — Tuyen Tra
(74) *Attorney, Agent, or Firm* — Antonio R. Durando (57) ABSTRACT

A spectrally controlled light source includes a light source with a spectral distribution repeated with a predetermined spatial period along an input plane so as to produce multiple copies of the spectral distribution separated by the spatial period. All copies are propagated through dispersive optics to produce equally dispersed spectra on an image plane. A periodic modulating element with a given filter period is applied to each of the dispersed spectra to produce corresponding modulated outputs. According to the invention, the spatial period of the light source on the image plane and the filter period of the modulating element are selected so as to produce a resonance effect that greatly enhances the utility of the spectrally modulated source.

20 Claims, 9 Drawing Sheets

LIGHT SOURCES FOR SPECTRALLY CONTROLLED INTERFEROMETRY

RELATED APPLICATIONS

This application is based on and claims the benefit of priority of U.S. Provisional Application No. 61/598,887, filed Feb. 14, 2012, which is hereby incorporated by reference in its entirety.

BACKGROUND OF THE INVENTION

1. Field of the Invention

This invention relates in general to the field of interferometry and, in particular, to a novel light source for spectrally controlled interferometry.

2. Description of the Prior Art

Laser interferometry is a highly successful technique for measuring optical surfaces such as lenses and flats. Its popularity can be attributed mainly to the use of common-path interferometer designs—a type of device in which the reference and test beams follow the same path inside the interferometer resulting in optical-system errors canceling out, which enables less expensive and more accurate measurements. However, common-path interferometers can be implemented only with laser sources because the need for non-zero optical path difference (OPD) requires a high temporal-coherence source and corresponding non-localized interference.

Another class of interferometers is built around temporally incoherent light sources (white light interferometry—WLI) and uses localized interference fringes for recovering the test surface profile. These interferometers are immune to the coherent noise present with laser sources but require careful balancing of the OPD so interference can take place in the measurement space. Such arrangements can be complex and prevent the use of common-path designs, therefore forfeiting its advantages.

As detailed in U.S. application Ser. No. 12/816,091, a new concept described as spectrally controlled interferometry (SCI) successfully combines both approaches and provides the advantages of common-path interferometry with those of WLI. SCI enables the formation of localized interference in an unbalanced OPD interferometer and can use, for example, the Fizeau common-path interferometer design in WLI mode. One of the major advantages of SCI is that existing instrumentation can be adapted to it simply by replacing the laser with a light source capable of proper spectral modulation.

In spectrally controlled interferometry, the time delay (and therefore the OPD) between the object and reference beams is manipulated by changing the spectral properties of the source. The spectral distribution is tuned to produce a modulation peak at a value of OPD equal to twice the optical distance between the object and reference arms of the Fizeau interferometer, for instance, thereby enabling the use of its common-axis configuration to carry out white-light measurements free of coherence noise. Unwanted interferences from other reflections in the optical path are also removed by illuminating the object with appropriate spectral characteristics. OPD scanning can be implemented without mechanical means by altering the source spectrum over time so as to shift the peak location by a predetermined scanning step between acquisition frames. The spectrum can also be controlled on a pixel-by-pixel basis to create a virtual surface that matches the profile of a particular sample surface. Therefore, the availability of an easily implemented spectrally controlled light source is of primary importance to the successful implementation of SCI.

Spectrally controlled interferometry's ability to produce localized fringes in a setup with non-balanced OPD is related to the period of the source's spectral modulation. In general, the higher the frequency of spectrum modulation, the further the fringes will form away from the reference surface. This property can be exploited by filtering out undesired wavelengths from a light source such as a light emitting diode (LED).

Figure 1:
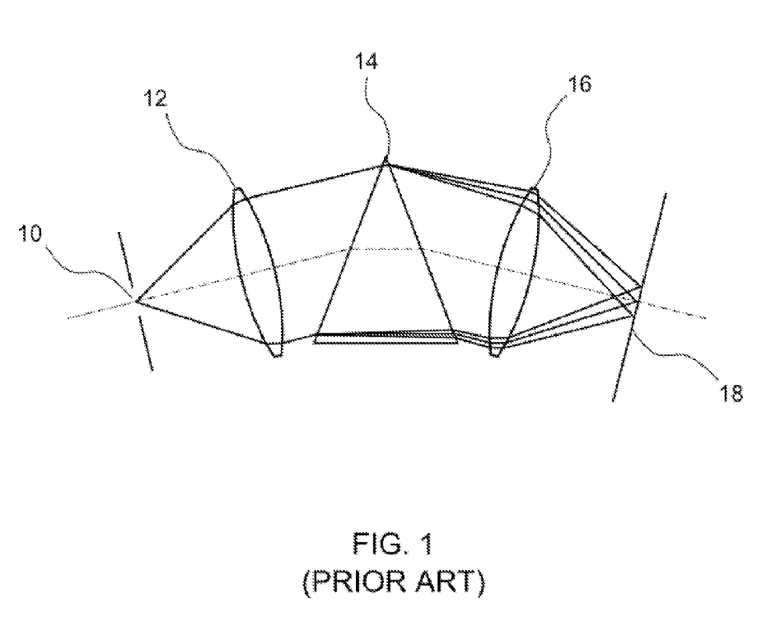
FIG. 1 is a schematic representation of a simple slit spectrometer used in the art as a basis for spectral filtering.

Conventional filtering systems are built around a slit monochromator design, such as illustrated in FIG. 1. A light source 10 (the monochromator's input slit) is positioned in the front focal plane of a collimating lens 12. The collimated light passes through a dispersive element, in this case a prism 14, and is refocused by the focusing lens 16 in the plane 18 of the resulting spectrum. The prism 14 disperses the light and the irradiance detected in the spectrum plane is the result of convolution of the source's spectrum with the width of the light source 10. The irradiance is described by the equation:

$$I_{slit}(\lambda,y')=I_s(y')*I_d(\lambda), \qquad (1)$$

where $\lambda$ is the wavelength, y' is the coordinate along the spectrum plane, I is light irradiance, * is the convolution operator, $I_{slit}$ is the irradiance distribution in the spectrum plane, $I_s(y')$ is the image of the slit through the spectrometer, and $I_d(\lambda)$ is the dispersion function of the prism.

Equation 1 shows that the ability to discriminate the spectrum is inversely proportional to the width of the light source 10 (the input-slit width). Shrinking the width of the light source, however, reduces the amount of light that enters the system and the image progressively becomes dimmer. This problem has been studied well in classical spectroscopy and is considered a fundamental limitation of this type of device.

Figure 2:
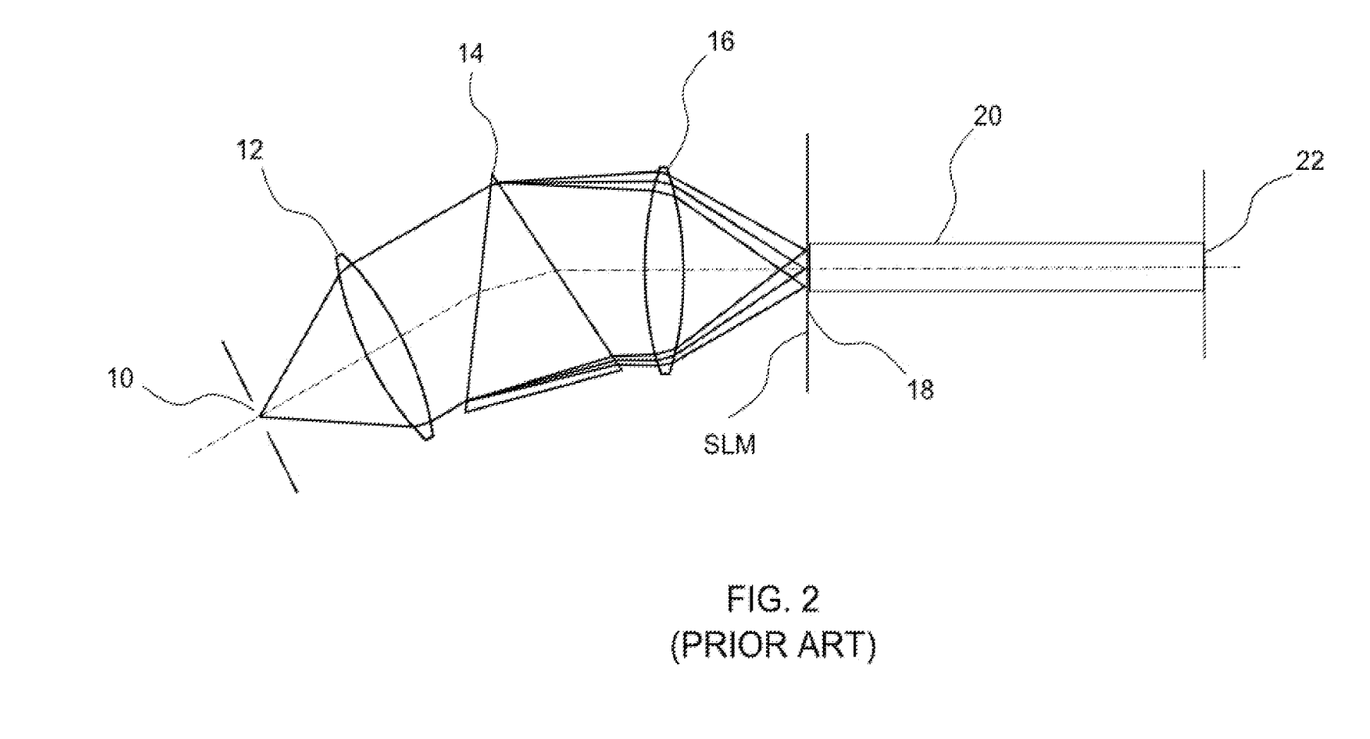
FIG. 2 is a schematic representation of a simple spectrally controlled light source based on the slit spectrometer configuration of FIG. 1.
Figure 3:
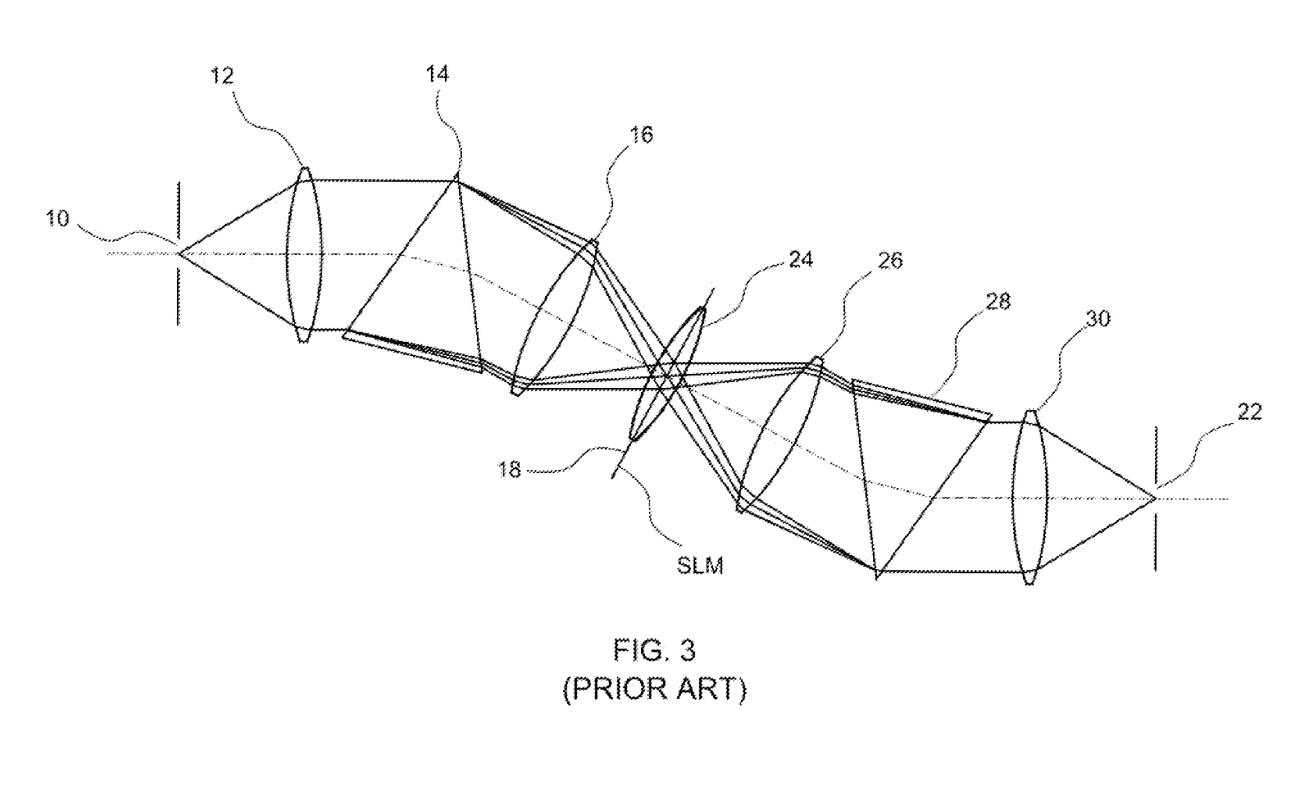
FIG. 3 is a schematic representation of a spectrally controllable source based on the slit spectrometer design of FIG. 1 where a spatial light modulator is introduced in the spectrum plane to provide spectrum filtering capability. The part of the filtering system after the SLM is a mirror image to the part before and is used to recombine the dispersed light into one beam.

Using the slit spectrometer arrangement of FIG. 1 as the basis for a simple spectrally modulated light source, a spatial light modulator (SLM) is placed in the spectrum plane 18. The SLM's active area is divided into individually controlled pixels with transmission or reflection properties that can be programmatically changed (see, for example, the SLM sold by Holoeye Photonics AG; http://www.holoeye.com/spatial-light_modulator_lc_2002.html). This feature allows the spectrum to be filtered by selectively blocking or attenuating parts of the SLM's active area. Simple arrangements are shown in FIG. 2 and FIG. 3, for example. In both arrangements the dispersive part of the system is essentially identical to the slit spectrometer shown in FIG. 1. In FIG. 2 the SLM is placed coincident with the spectrum plane 18 and a light pipe 20 is used to recombine the filtered spectrum and deliver it to the output plane 22, which can then be used as the source for SCI. In FIG. 3 the filtered light from the spectrum plane 18 is recombined by using a symmetrically placed spectrometer system (parts 26, 28 and 30). A lens 24 is used as a collector to increase light efficiency. The filtered light is recombined in the output slit 22 that can be used as the source in SCI. In essence, the exit 22 of such device forms an extended light source with spectral energy density controlled via an SLM or an equivalent device, such as a grating, placed on the spectrum plane 18. A reflective or transmissive SLM can be accommodated by small changes in the setup.

The basic problem with such arrangements is the trade-off between the spectral resolution and the amount of useful energy in the spectrally filtered beam. The efficiency of such devices can be increased by using a high-spatial coherence source with low temporal coherence, such as a superluminescent diode. Such devices have very high intensity (expressed in W/sr*m²), comparable to lasers, but a wide emission spectrum, comparable to LEDs. See, for example, the superluminescent diode sold by Qphotonics, LLC (http://www.qphotonics.com). However, such devices need a similar level of control as laser diodes (LD) for both current and temperature, which requires expensive electronics and heat sinks. Also, their emission spectra are typically located in the far-red spectrum and infrared, making them less useful for interferometry where the typical operating wavelength is 632.8 nm.

In view of the foregoing, a light source that overcomes these problems would be very desirable and would represent a significant advance in the art because it would facilitate the implementation of spectrally controlled interferometry with its shown advantages of both laser and white-light interferometry.

SUMMARY OF THE INVENTION

In its simplest terms, the spectrally controlled light source of the invention includes a light source with a spectral distribution repeated with a predetermined spatial period along an input plane so as to produce multiple copies of the spectral distribution separated by the spatial period. All copies are propagated through dispersive optics to produce equally dispersed spectra on an image plane. A periodic modulating element with a given filter period is applied to each of the dispersed spectra to produce corresponding modulated outputs. According to the invention, the spatial period of the light source on the image plane and the filter period of the modulating element are selected so as to produce a resonance effect that greatly enhances the utility of the spectrally modulated source.

The output of the spectrally controlled light source may be collected in light collection element, such as a fiber bundle, and used as the source in a spectrally controlled interferometer. Because the filtering function of the modulation element can be selected as needed for a particular application, the source of the invention is well suited for use in SCI.

Various other advantages will become clear from the description of the invention in the specification that follows and from the novel features particularly pointed out in the appended claims. Therefore, this invention includes the features hereinafter illustrated in the drawings, fully described in the detailed description of the preferred embodiments and particularly pointed out in the claims, but such drawings and description disclose only some of the various ways in which the invention may be practiced.

BRIEF DESCRIPTION OF THE DRAWINGS

FIG. 7 shows the effect of filtering with a periodical structure having a period equal to the distance between the source's slits. Consecutive graphs show the effect of filtering on the spectra from corresponding consecutive slits. Because the spatial period of the filtering function is matched to the spatial period of the image of the source on the spectral plane, the effects are identical regardless of what slit the spectrum is derived from.

DETAILED DESCRIPTION OF THE INVENTION

As used in this disclosure, "white light" is intended to refer to any broadband light of the type used in the art of white-light interferometry, typically having a bandwidth on the order of many nanometers. With reference to light, the terms "frequency" and "wavelength" are used alternatively, as commonly done in the art, because of their well known inverse relationship. "OPD" and "time delay" are used alternatively because of their space/time relationship in interferometry. Similarly, "sine" and "cosine," as well as related terms, are used alternatively unless specifically indicated otherwise. As used herein, the terms "modulate" and "modulation" in connection with a light source refer in the broadest sense to include any alteration of the frequency distribution, amplitude distribution or phase distribution of energy produced by the light source, and the synthesis of a light signal having a desired frequency, amplitude and phase distribution by any means. With reference to a light source, the term "extended" refers to any spatially incoherent light source, as contrasted to a highly coherent point source, such as a laser.

According to the invention, the slit spectrometer limitations are overcome to provide extended, high power, light sources with a spectrum that can be modulated for use in spectrally controlled interferometry (SCI). The most basic and yet very useful modality of SCI is based on using a sinusoidally modulated spectrum light source with the effect of 'projecting' the fringe envelope at some distance with respect to the zero OPD condition. (See Ser. No. 12/816,091.) For example, in a Fizeau interferometer this means creating localized interference fringes on an object placed at some distance from the return flat. The distance is determined by the period of the spectral modulation; by changing, an effect equivalent to WLI scanning is achieved.

The requirement of spectrum modulation periodicity is the key to overcoming the single-slit source disadvantage described above because it makes it possible to build a source that has low spatial and temporal coherence by breaking it up into a series of identical, highly spatially coherent sources for which the effects of spectrum filtering add together, reinforcing the cumulative effect.

Figure 4:
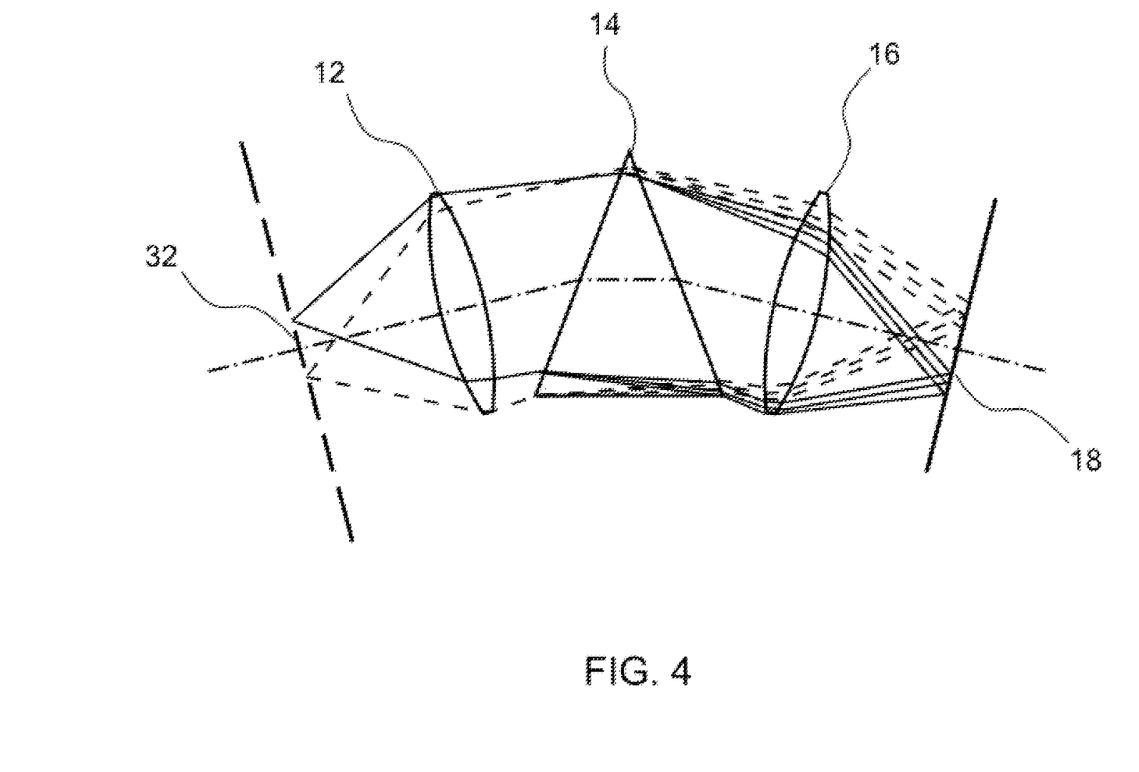
FIG. 4 is a schematic representation of a multiple-slit spectrometer that forms the basis for an improved spectrally controlled light source according to the invention. The single input slit has been replaced by a periodic light source that can be considered a collection of equally spaced multiple parallel slits.
Figure 5:
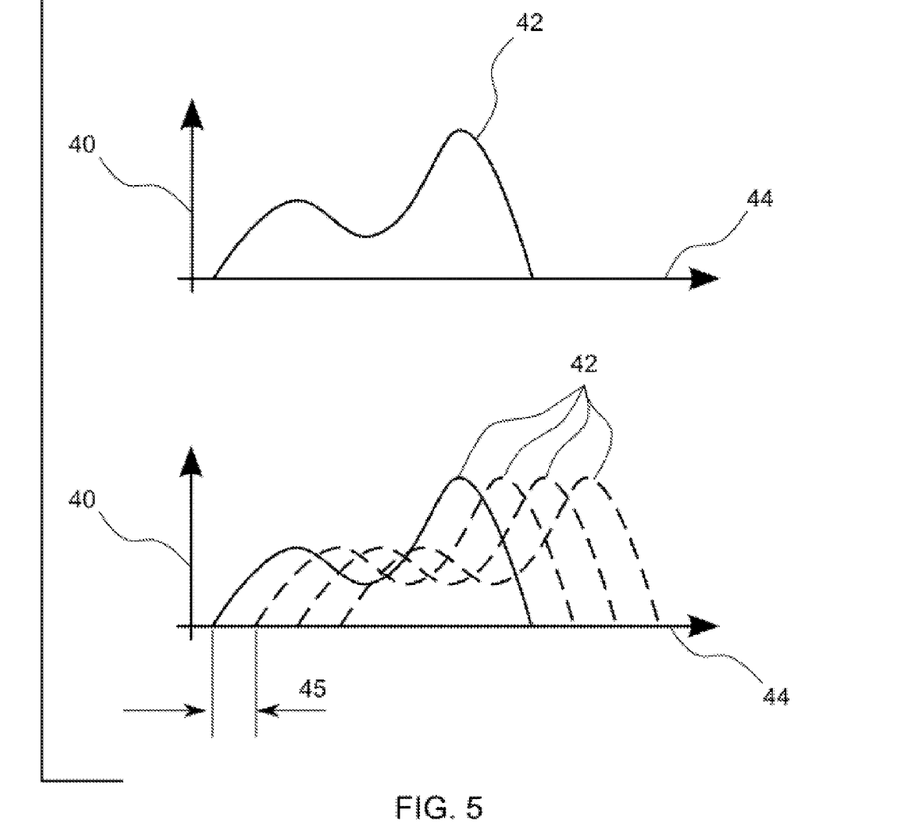
FIG. 5 is an example of the intensity distribution in the spectrum plane of a single-slit spectrometer, such as illustrated in FIG. 1 (upper curve), and of a multiple slit spectrometer, as illustrated in FIG. 4 (lower curves). The lower curves are multiple copies of the upper curve spaced along the spectrum plane coordinate. The abscissa of the plot is used for convenience to indicate both wavelength and spatial distance along the spectrum plane. The distance between the copies of the spectrum along the spectrum plane coordinate is equal to the image of the spatial period on the spectrum plane (that is, the distance between the equally spaced multiple parallel slits of FIG. 4 times the magnification of the optics).

Consider, for example, a spectrometer such as shown in FIG. 4 (similar to the ones described above with reference to FIGS. 1, 2 and 3), where the single-slit source 10 has been replaced by a multiple-slit source 32 that has spatial periodically modulated intensity. The rest of the system is identical to the system of FIG. 1. In particular, the periodic source can be easily constructed by placing a Ronchi ruling in front of an extended light source. Optically this arrangement can be considered a superposition of multiple single-slit sources and the corresponding properties described above apply to each single slit. Because the input light is temporally incoherent, the resulting intensity distribution in the spectrum plane is simply the sum of the intensities from the individual slits. This concept is illustrated in FIG. 5. In the case of a single slit, the intensity 40 in the spectrum plane expressed as a function of light frequency along the plot's abscissa 44 is shown in the upper graph as curve 42. The lower graphs show multiple copies of the curve 42 shifted in the spectral plane by an amount 45 corresponding to the distance between the input slits multiplied by the system magnification. Note that the abscissa of the plot is used for convenience to indicate both wavelength and spatial distance along the spectrum plane. The shift is the result of multiple slits illuminating the spectrometer. Mathematically it is expressed as $$I_{all}(y') = \sum_n I_{slit}(y' - nMd), \quad (1)$$

where $I_{all}$ is the intensity in the spectrum plane from all slits, $I_{slit}$ is the intensity response of a single slit, M is the total magnification of the system, d is the input source period (the distance between two consecutive slits), and n is the index of the slit. However, such device is of little use because the spectra are intermixed.

Figure 6:
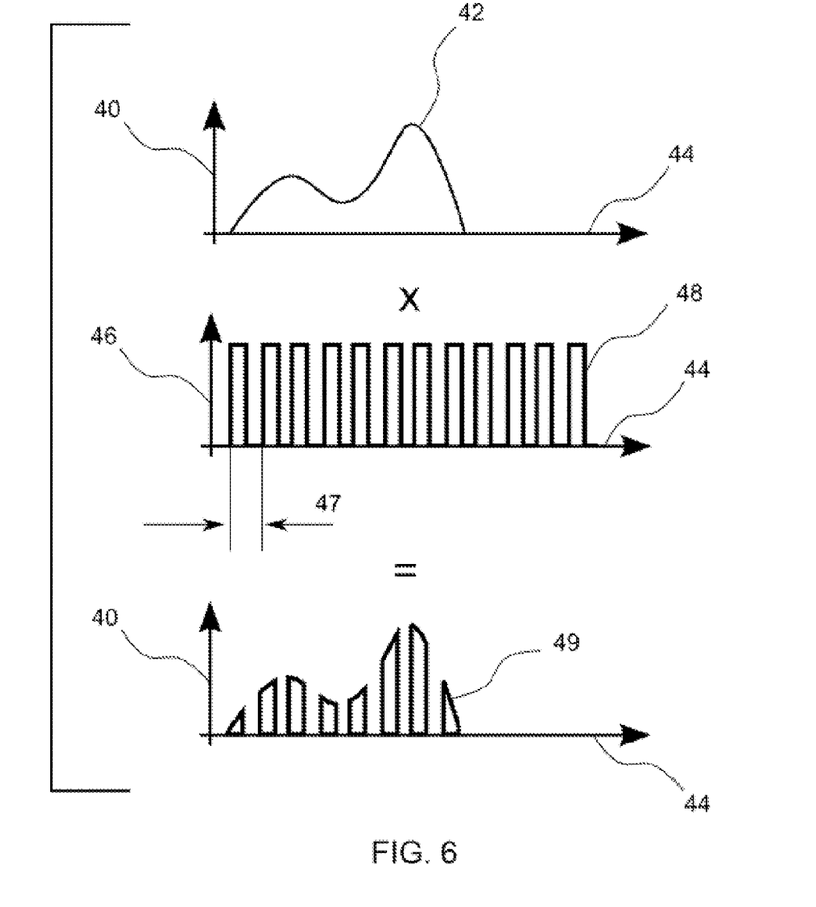
FIG. 6 shows the effect of filtering a spectrum from a single slit with a spatial light modulator or a grating. The original spectrum of the single slit in a slit spectrometer (upper plot) is filtered by a Ronchi ruling (middle plot) composed of periodic transparent and opaque lines. The bottom plot shows the superposition of the two plots, resulting in a spectrum that is periodically filtered.

According to the invention, a filtering element with a periodically modulated transmission (such as a Ronchi ruling) with a spatial period that matches the image of the input source period (or its harmonic, i.e., multiples of the base frequency) is placed at the spectral plane 18 of the system. The effect of such grating in the case of a single-slit source is illustrated in FIG. 6, where the transmission function 48 of the Ronchi ruling is expressed as transmittance 46 as a function of spectrum frequency along the axis 44. The spectrum 42 shown in the upper plot is multiplied by the transmission function 48 of the grating (in general a filtering function) with period 47 in the frequency domain and the result is the output spectral intensity 49 shown in the lower graph. This case illustrates a simple spectrally modulated source, as described above in the section devoted to the single-slit spectrometer.

Considering now the effects of such modulation on the output light received through other slits from the same source, each slit's spectrum 42 (FIG. 5) is subject to the same modulation to produce output spectra 50, 52, 54, 56 (illustrated in FIG. 7), but each frequency is shifted along the coordinate perpendicular to the slits (i.e., in the dispersion direction) by a spatial shift 45 equal to the period of the source multiplied by the system magnification. This effect is illustrated in greatly exaggerated fashion in FIG. 7 with reference to a given position 59 in the spectral image plane. Note that the shift 45 is a spatial quantity in the spectral image plane and it is so illustrated in the abscissa 44 of each plot. When the periodic filtering function 48 has a period 47 that matches the shift 45 between the spectra obtained from consecutive slits separated by the source shift (corresponding to the distance between adjacent input slits), the effect of such filtering on the spectrum from individual slits will be identical.

Figure 7:
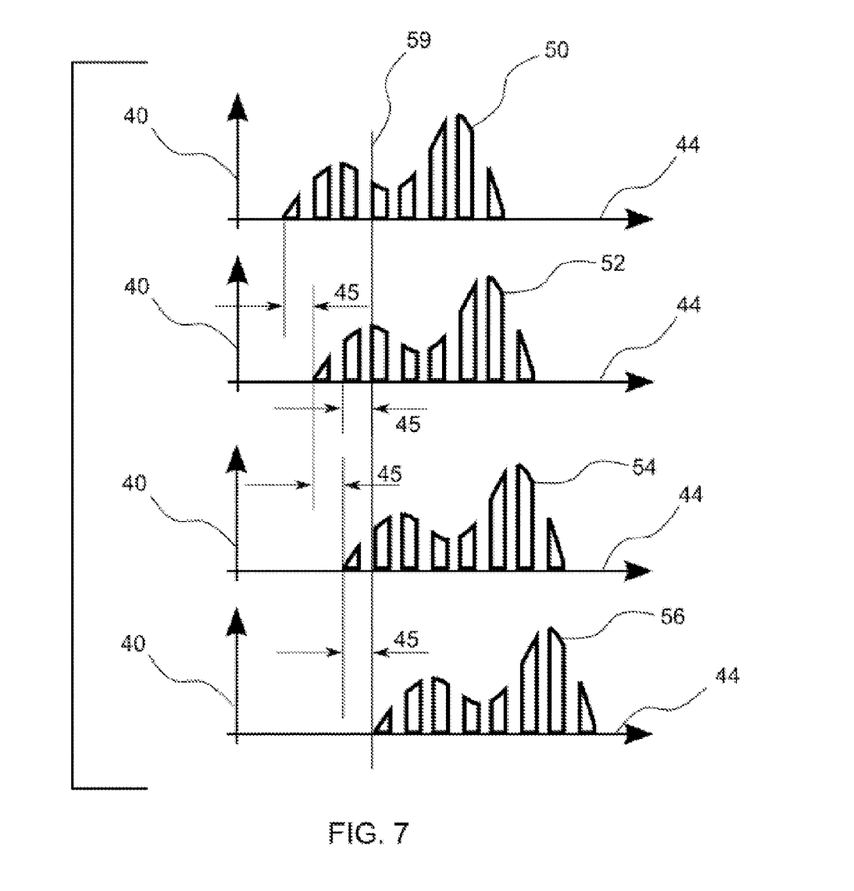

Thus, by carefully choosing the optical period of the source and the period 47 of the filtering function, a 'resonance' effect is produced; i.e., a situation where the shifted filtered spectral patterns reinforce each other. Therefore, an extended periodically spectrally modulated light source can be obtained to overcome the fundamental limitation of the single-slit based modulators. To that end, the filtered light is recombined to form a continuous light source using light pipes, waveguides or similar devices. It is worth noting that the spectral distribution of light in each slit is not required to be identical but it is shown as such to facilitate the explanation of the invention. In real devices such distribution can vary, such as by placing a grating in front of the periodic slits or by having slits composed of individual light emitting structures (such as small-size LEDs) with distinct spectral properties.

The filtering function (a periodic element placed in the spectral plane) can have amplitude and/or phase filtering properties and take advantage of the 'resonance' effect as long as it is periodic and its period is equal to the period of the imaged slits of the input source (or its harmonic, i.e., multiples of the base frequency). The profile of the filtering function within each 'period' can be arbitrary; i.e., it does not need to be binary or sinusoidal.

Mathematically, the condition of spectral 'resonance' can be expressed as:

$$nMP_s = mP_f, \quad (3)$$

where n and m are integers, $P_s$ is the period of the source, M is the magnification between the input and spectrum planes, and $P_f$ is the period of the filtering function.

Figure 8:
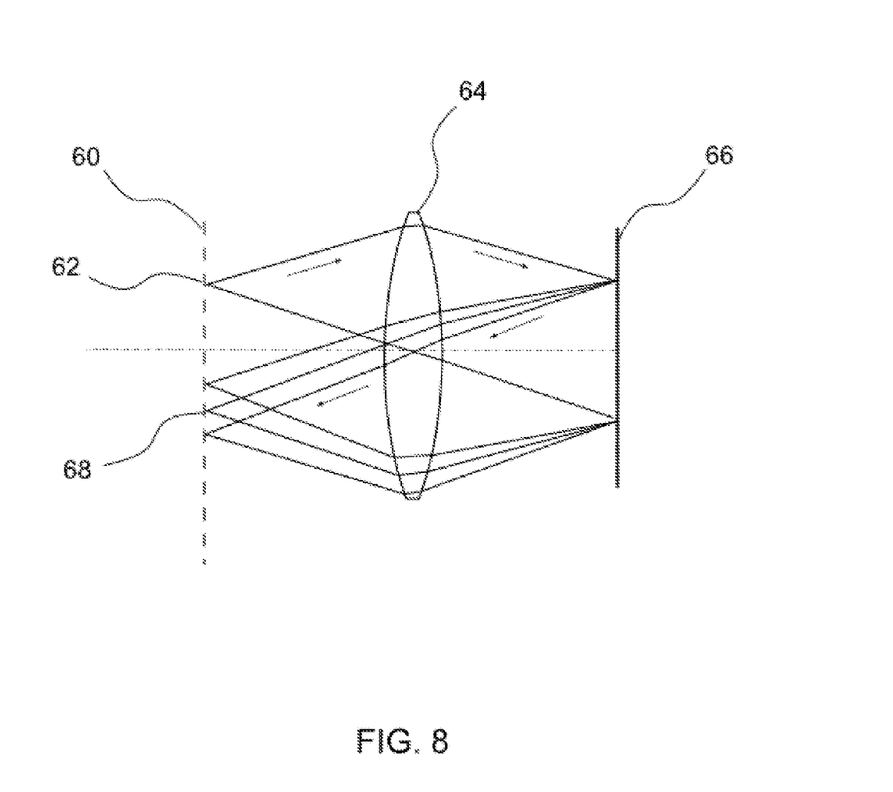
FIG. 8 is a schematic representation of a preferred embodiment of the invention using a grating. The input and output are on a single plane where a grating (Ronchi ruling) is placed. The input light is shone onto the grating, collimated by a lens and diffracted by a blazed grating. The diffracted light is then re-imaged by the same lens in the input-output plane with a magnification of −1. Thus, the grating automatically provides the filtering function with the same period of the input light.

A simple embodiment of a periodic source according to the invention is shown schematically in FIG. 8. A periodic element such as a Ronchi ruling 60 is placed in the front focal plane of a collimating lens 64. The periodic element 62 will act as both a multiple slit source and as a periodic filtering function element in the spectrum plane 68. Tracing the light path through the system, the external light used to illuminate the grating is identified by reference numeral 62. After passing through the grating 60, it is collimated by the lens 64 and directed toward a reflective disperser 66, such as a blazed diffraction grating. A prism with a reflective back surface can be used for this purpose as well. After diffracting on the grating, the collimated light is reflected back towards the lens 64 and in the front focal plane (coinciding with grating 60) it forms shifted spectrum images as described above. The same grating 60 that provides the periodic light source also provides the filtering function applied to the spectrum images formed by the lens 64. Because the magnification between the input and spectrum plane is −1, the period of the filtering function is automatically matched to the period of the input source. Therefore, after passing the grating 60, the output beam will be periodically spectrally modulated as needed for SCI applications.

Different gratings can be used to achieve different spectral modulations of the input light. Similarly, a wheel with different frequency gratings can be used to facilitate the change.

In practical applications it would be advantageous to have a dynamically controlled periodic modulator of the spectrum. This would allow, for example, scanning of fringe patterns, such as in conventional WLI. Such a setup may be implemented using a digital mirror device (DMD) of the type available from Texas Instruments, a device that is ideally suited for this purpose. A DMD is an electronically controlled array of small mirrors where each mirror can assume one of three states: two tilted positions at +/−12° and a neutral rest position with no tilt. Commercially available DMD devices have square mirrors laid out on a rectangular grid with a 7.6 μm period and a tilt about their diagonal. Each mirror can be controlled individually at rates reaching 2.4 kHz and beyond. Because of its properties this device is uniquely suitable to play the role of the periodic source and filtering function in the setup described above.

Figure 9:
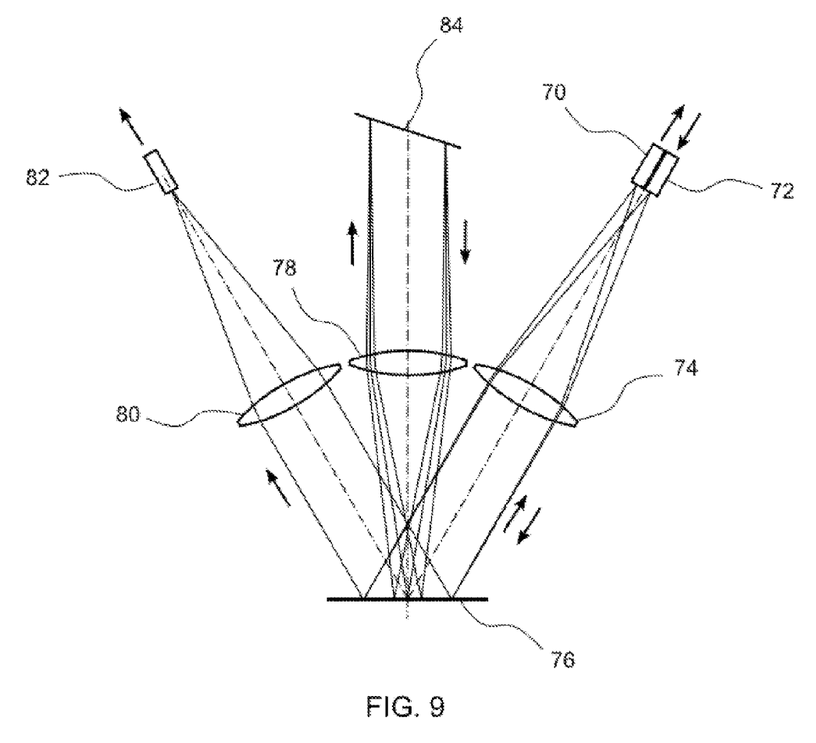
FIG. 9 is an example of the spectrally controlled light source of FIG. 8 using a Digital Mirror Device (DMD).

FIG. 9 shows a schematic representation of such a device. An input light source 72 is placed in the front focal plane of a collimating lens 74. The collimated input light illuminates a DMD 76 at an angle chosen such that the reflected light propagates on axis towards a lens 78 positioned in front of a disperser 84. In the case of a typical DMD, this angle would be 24°. In this configuration the DMD acts as a light source for the lens/disperser assembly. The disperser 84, preferably a blazed grating, is chosen such that the center wavelength of the dispersed light propagates axially back towards the lens 78 and then is imaged back onto the DMD. As described previously, the DMD also acts as a periodic filter and reflects light back towards the input lens 74. In the input plane the filtered light can be collected by a suitable device 70, such as a fiber bundle, and used as the source in a spectrally controlled interferometer. It is also possible to direct the reflected light to the other side of the DMD towards an output 82 by tilting the complementary set of mirrors away from the incoming beam.

Such DMD devices provide the ability to change the period of the filtering function dynamically (and simultaneously the periodic slit source) by specifying different combinations of mirrors activated at any given time. Also, by properly timing the on/off states of the mirrors, it is possible not only to modulate the spectrum in a similar manner as a Ronchi ruling (i.e., entirely blocking or passing particular spectral bands), but also to achieve a partial energy blocking equivalent to using a filtering function with adjustable transmission. To achieve this effect a method of pulse-width modulation (PWM) can be used that relies on activating the mirror only during part of the detector's integration time so as to allow only a partial energy transfer. For example, assume that the SCI is equipped with a camera with the integration time set to 10 ms (i.e., in order to form a single image, it collects light for 10 ms). If during the entire integration time a particular set of DMD mirrors is in 'on' position, they will transmit a maximum amount of light. This light level will be used as a reference and marked as 100%. By turning on the DMD mirrors only for part of the integration time, the amount of light that reaches the detector can be reduced proportionately, hence achieving the same effect as if the DMD mirrors had partial reflectivity. If the 'on' time is set to be half the integration time (5 ms), the equivalent energy transfer is 50%, etc. So, by varying the duty cycle of particular mirrors, it is possible to simulate a source and a filtering function that have continuous transmission as opposed to the simple 0%/100% properties of a Ronchi ruling. This property is particularly important when the period of the intended modulation does not match an equivalent spacing of the mirrors in the DMD array and can also be used to adjust the total energy throughput of the device.

While the invention has been shown and described herein in what is believed to be the most practical and preferred embodiments, it is recognized that departures can be made therefrom within the scope of the invention. For example, the invention has been described in terms of slits periodically distributed along an input plane, but it is understood that a different surface, such as a spherical surface, could be used in equivalent manner for particular applications. The same can be said for the image plane at the output of the spectrally controlled light source of the invention. Therefore, the invention is not to be limited to the disclosed details but is to be accorded the full scope of the claims, including any and all equivalents thereof.

The invention claimed is:

1. A spectrally controlled light source comprising:
a plurality of light sources distributed with a predetermined spatial period along an input surface so as to produce multiple spectral distributions separated by said spatial period;
a dispersive element producing dispersed spectra of said multiple spectral distributions on an image spectrum surface; and
a periodic modulating element with a filter period operating on each of said dispersed spectra to produce corresponding modulated outputs;
wherein said predetermined spatial period and the filter period of the modulating element are selected so as to satisfy the following relationship:

$$nMP_s = mP_f,$$

where n and m are integers, $P_s$ is said predetermined spatial period, M is the magnification between the input and spectrum surfaces, and $P_f$ is the filter period of the modulating element.

2. The spectrally controlled light source of claim 1, wherein said input surface comprises multiple slits, said multiple spectral distributions propagating from said slits.

3. The spectrally controlled light source of claim 2, wherein said plurality of light sources comprises a grating placed in front of a spatially incoherent source.

4. The spectrally controlled light source of claim 3, wherein said periodic modulating element is said grating placed in front of the spatially incoherent source.

5. The spectrally controlled light source of claim 1, further including a light collection element combining said modulated outputs.

6. The spectrally controlled light source of claim 1, wherein said dispersive element is diffractive.

7. The spectrally controlled light source of claim 1, wherein said periodic modulating element is a grating.

8. The spectrally controlled light source of claim 1, wherein said multiple spectral distributions are equal.

9. The spectrally controlled light source of claim 1, wherein said periodic filtering element is a digital mirror device.

10. The spectrally controlled light source of claim 1, wherein n and in are equal to one.

11. A method of producing a spectrally controlled light source, comprising the following steps:

providing a plurality of light sources distributed with a predetermined spatial period along an input surface so as to produce multiple spectral distributions separated by said spatial period;

dispersing said multiple spectral distributions to produce dispersed spectra thereof on an image spectrum surface; and modulating said dispersed spectra with a periodic modulating element to produce corresponding modulated outputs, said modulating element having a filter period related to said predetermined spatial period so as to satisfy the following relationship:

$$nMP_s = mP_f,$$

where n and m are integers, $P_s$ is said predetermined spatial period, M is the magnification between the input and spectrum surfaces, and $P_f$ is the filter period of the modulating element.

12. The method of claim 11, wherein said input surface comprises multiple slits, said multiple spectral distributions propagating from said slits.

13. The method of claim 12, wherein said plurality of light sources comprises a grating placed in front of a spatially incoherent source.

14. The method of claim 13, wherein said periodic modulating element is said grating placed in front of the spatially incoherent source.

15. The method of claim 11, further including the step of combining said modulated outputs in a collection element.

16. The method of claim 11, wherein said dispersing step is carried out with a diffractive element.

17. The method of claim 11, wherein said periodic modulating element is a grating.

18. The method of claim 17, wherein said multiple spectral distributions are equal.

19. The method of claim 11, wherein said periodic filtering element is a digital mirror device.

20. The method of claim 11, wherein n and in are equal to one.

* * * * *

UNITED STATES PATENT AND TRADEMARK OFFICE
CERTIFICATE OF CORRECTION

| | | |
|---|---|---|
| PATENT NO. | : 8,810,884 B1 | Page 1 of 1 |
| APPLICATION NO. | : 13/766502 | |
| DATED | : August 19, 2014 | |
| INVENTOR(S) | : Artur Olszak | |

It is certified that error appears in the above-identified patent and that said Letters Patent is hereby corrected as shown below:

In the Claims:

On line 65 of col. 8, in claim 10, please replace "in" with --m--.

On line 17 of col. 10, in claim 20, please replace "in" with --m--.

Signed and Sealed this
Twenty-first Day of October, 2014

Michelle K. Lee
*Deputy Director of the United States Patent and Trademark Office*